G. FRENKEL.
MACHINE FOR MANUFACTURING LINOLEUM MOSAIC.
APPLICATION FILED DEC. 17, 1914.
1,155,718.
Patented Oct. 5, 1915.
6 SHEETS—SHEET 1.
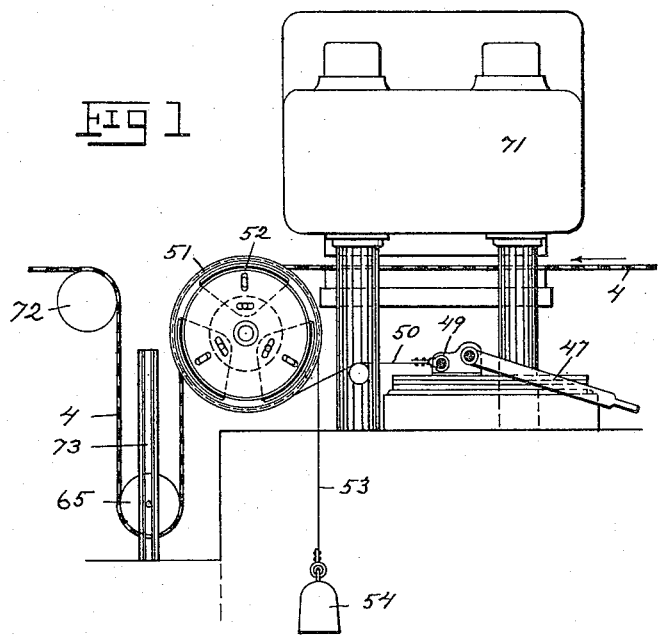
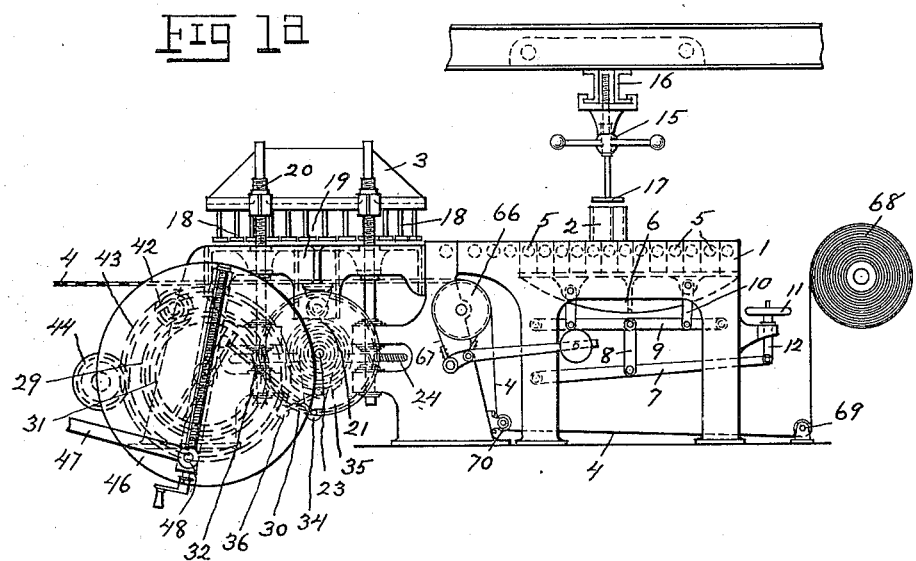
WITNESSES:
M. L. Lefevre
H. D. Hopkins
INVENTOR.
Gustav Frenkel
BY John J. Thompson
ATTORNEYS.

G. FRENKEL.
MACHINE FOR MANUFACTURING LINOLEUM MOSAIC.
APPLICATION FILED DEC. 17, 1914.
1,155,718.
Patented Oct. 5, 1915.
6 SHEETS—SHEET 2.
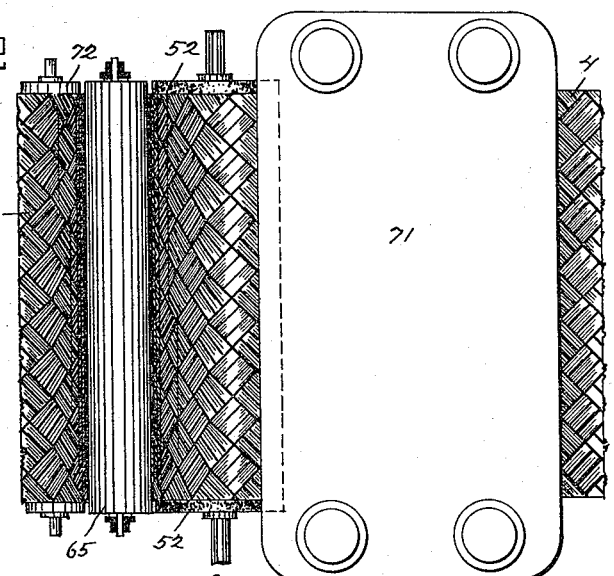
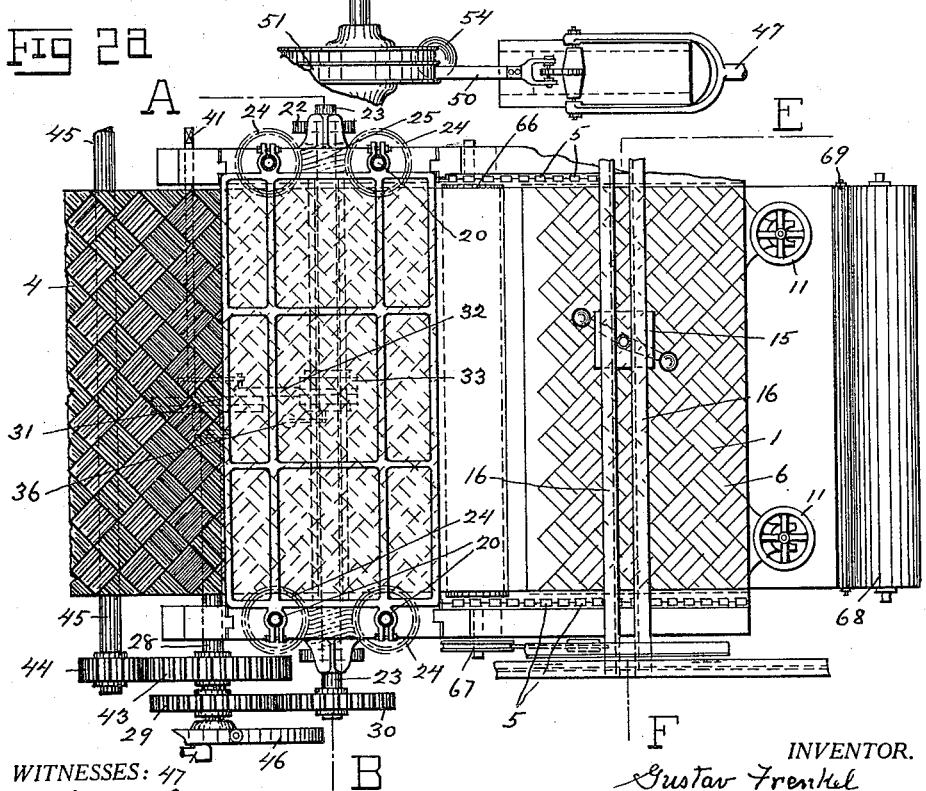
WITNESSES:
M. L. Lefevre
N. D. Hopkins
INVENTOR.
Gustav Frenkel
BY John J. Thompson
ATTORNEYS.

G. FRENKEL.
MACHINE FOR MANUFACTURING LINOLEUM MOSAIC.
APPLICATION FILED DEC. 17, 1914.
1,155,718.
Patented Oct. 5, 1915.
6 SHEETS—SHEET 3.
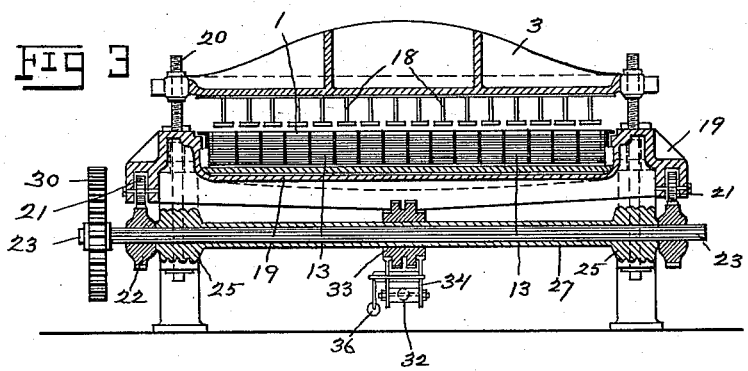
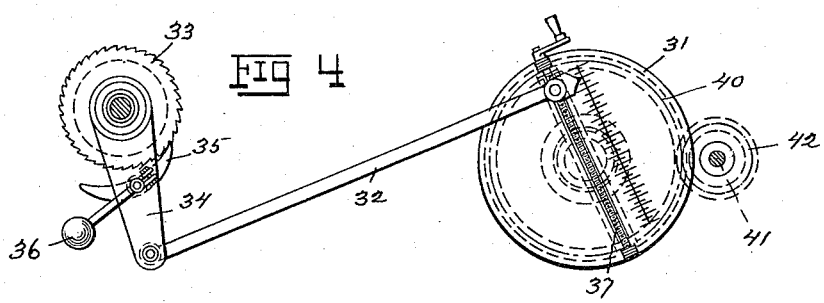
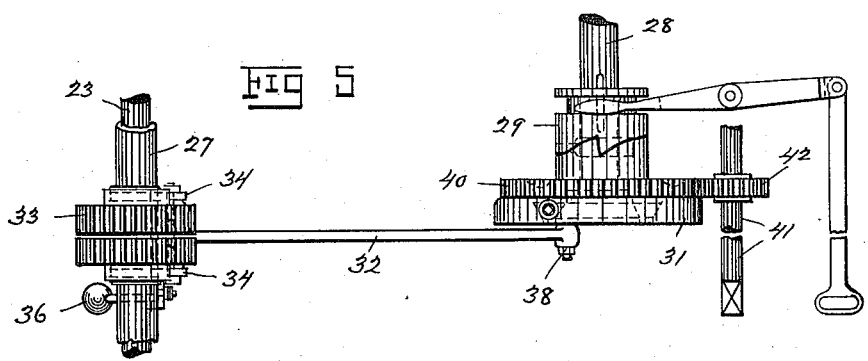
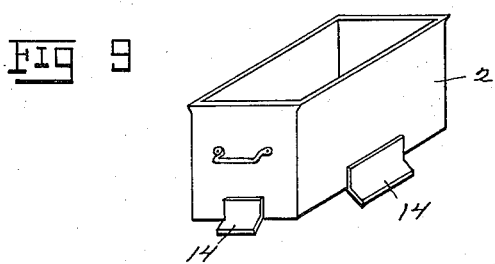
WITNESSES:
M. L. Lefeve.
N. D. Hopkins
INVENTOR.
Gustav Frenkel
BY John Thompson
ATTORNEYS.
COLUMBIA PLANOGRAPH CO., WASHINGTON, D. C.

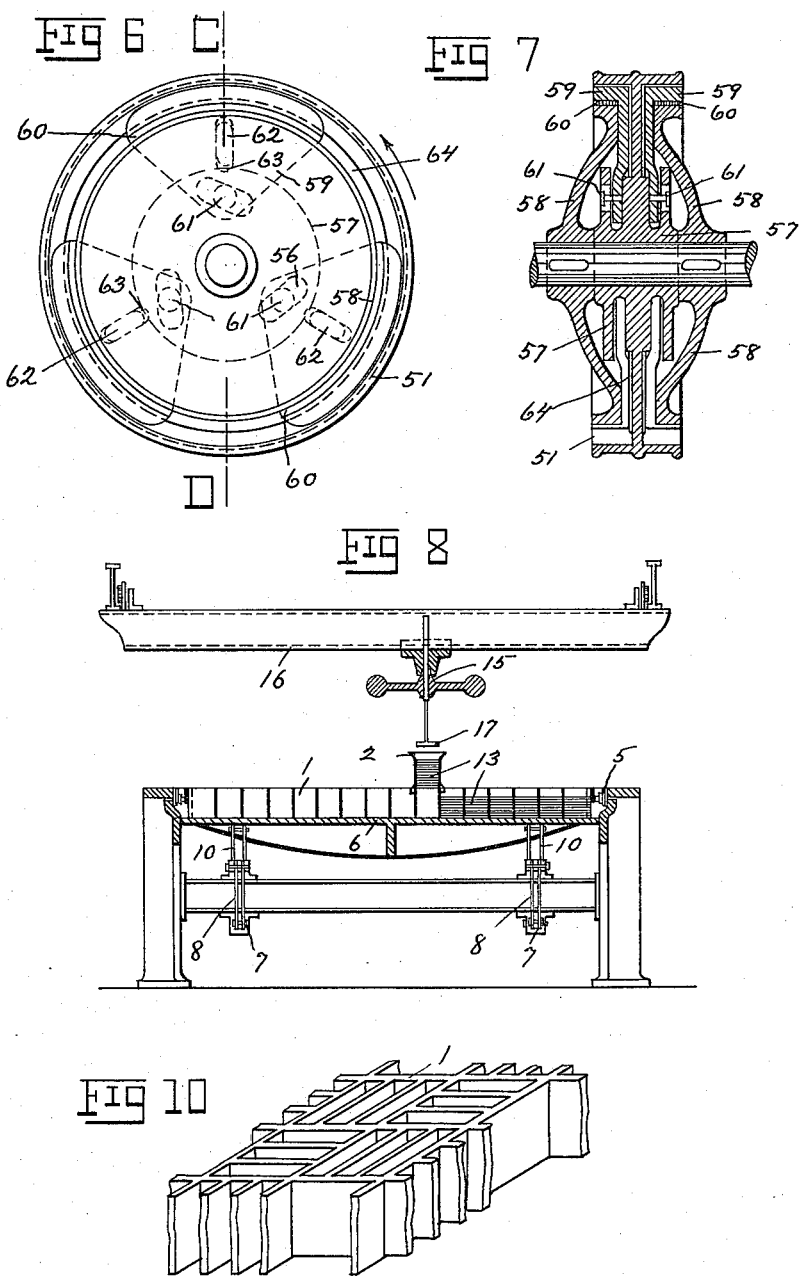

G. FRENKEL.
MACHINE FOR MANUFACTURING LINOLEUM MOSAIC.
APPLICATION FILED DEC. 17, 1914.
1,155,718.
Patented Oct. 5, 1915.
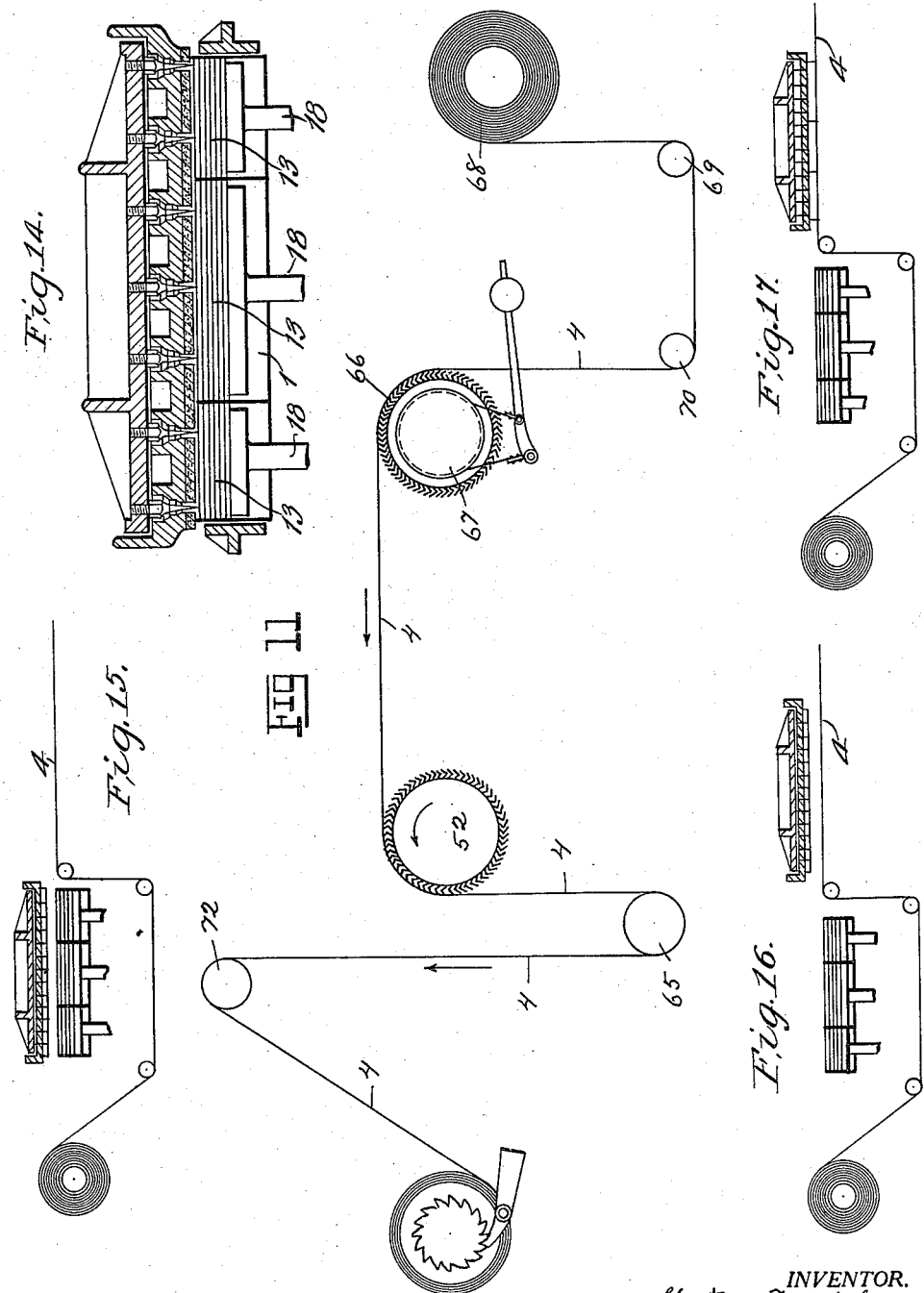

G. FRENKEL.
MACHINE FOR MANUFACTURING LINOLEUM MOSAIC.
APPLICATION FILED DEC. 17, 1914.
1,155,718.
Patented Oct. 5, 1915.
6 SHEETS—SHEET 6.
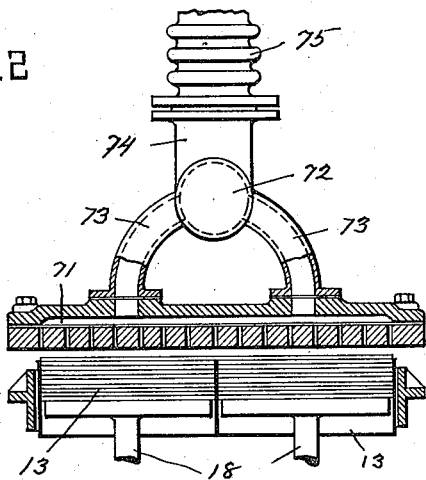
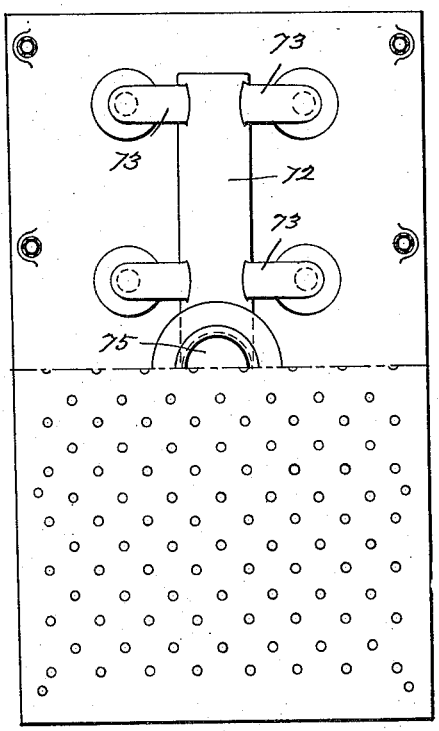
WITNESSES:
INVENTOR.
Gustav Frenkel
BY
ATTORNEYS.

UNITED STATES PATENT OFFICE.

GUSTAV FRENKEL, OF SAN FRANCISCO, CALIFORNIA, ASSIGNOR TO ARMSTRONG CORK COMPANY, OF PITTSBURGH, PENNSYLVANIA, A CORPORATION OF PENNSYLVANIA.

MACHINE FOR MANUFACTURING LINOLEUM-MOSAIC.

1,155,718.  Specification of Letters Patent.  Patented Oct. 5, 1915.

Original application filed November 2, 1909, Serial No. 525,913. Divided and this application filed December 17, 1914. Serial No. 877,814.

*To all whom it may concern:*

Be it known that I, GUSTAV FRENKEL, a subject of the German Emperor, residing at San Francisco, in the county of San Francisco and State of California, have invented certain new and useful Improvements in Machines for Manufacturing Linoleum-Mosaic, of which the following is a specification, reference being had therein to the accompanying drawing.

This invention relates to a machine for manufacturing linoleum mosaic, and the present application is divided from my patent issued January 26, 1915, for a process, No. 1,126,440, and the invention is based on the utilization of the elasticity of the linoleum pulp, whereby it is rendered possible to place the individual pieces of linoleum at the same time in close juxtaposition on a supporting fabric in such a way that the hitherto customary joints which were due to the walls of a mold or to inexact placing are avoided. The figure-pieces which from the commencement are cut or stamped somewhat larger than their size in the finished design, expand in consequence of the elasticity of the linoleum pulp after leaving a mold in which they were previously compressed, and close together with lateral pressure, so that during the subsequent pressing operations a firm and intimate connection of the individual pieces is obtained. Without providing the side walls of the individual figure-pieces or the fabric previously with an adhesive substance, a linoleum can, according to the present invention, be produced in the case of which the web composed of figure-pieces does not break at the joints of the figure-pieces as was the case with the linoleum mosaic hitherto manufactured from individual pieces.

According to the present invention, the individual figure-pieces of the linoleum material are placed in boxes from which they are pressed by means of spindle or lever presses into a mold movable in a horizontal frame, or the figure-pieces are piled up side by side in a fixed mold capable of being taken to pieces and the mold is then screwed together, the figure-pieces becoming likewise easily compressed. The compression effects two objects, viz., firstly the figure-pieces are held firmly in the mold by the friction at the walls of the latter and can be removed again only by being pressed out of the same, and secondly, the pressing or compressing operation readily effects the compression of the figure-pieces, so that after leaving the mold they expand again in consequence of their elasticity, and in this manner close the fine joints due to the mold or to being unequally laid. After the mold is filled the latter is either run under a pressure-plate provided with stamps, which pressure-plate from time to time presses a layer of the pieces simultaneously from above on to a supporting fabric or the stamps press the figure-pieces from below out of the mold which in this case is fixed, whereupon the layer of figure-pieces left free by the mold is lifted off by suitable devices and is placed on a fabric after the latter has been fed forward by an amount corresponding to the linoleum material which has been applied.

In the drawings:—Figure 1, represents in side elevation one portion of a machine for carrying out the present process. Fig. 1$^a$, is a similar view of the other portion of the machine. Fig. 2, is a plan view of that portion of the machine shown in Fig. 1. Fig. 2$^a$, is a similar view of that portion of the machine illustrated in Fig. 1$^a$. Fig. 3, is a cross-section through the machine on the line A—B, Fig. 2$^a$. Figs. 4, 5, 6, 7, 9, and 10, show details. Fig. 8, illustrates a cross section through a charging device on the line E—F, (Fig. 2$^a$). Fig. 11, represents diagrammatically the guides for the supporting fabric, while Fig. 12, is a partial view of a modified form of the machine, and is a vertical section showing the device as operated by suction. Fig. 13, is a plan view of the same. Fig. 14, is a vertical sectional view of another modified form, showing the use of pins. Figs. 15, 16, and 17, illustrate the three steps of the operation of the machine.

When using a horizontally movable mold from which the figure-pieces are forced out from above downward to a fabric, the mold 1, resting on the rollers 5, is first brought above the table plate 6, and the latter is raised up to the mold by the lever-mechanism 7, 8, 9, 10, (Fig. 1$^a$), with the aid of the screwed spindles 12 (Figs. 1$^a$ and 2$^a$), provided with the hand-wheels 11, so that the mold rests perfectly on the table plate.

Then a charging box 2, of which several may be present, is brought on to the mold 1, with the figure-pieces 13 (Fig. 8) situated therein. The box keeps its exact position with regard to the mold by means of the pieces 14 (Fig. 9) on said box. The figure-pieces 13, are forced into this box 2, either directly by means of a stamp or the box is charged by hand, in such a way that the figure-pieces are piled, one above another to the requisite number and the box is then reversed and forced over the same. The upper edges of the box are splayed outward slightly which prevents the figure-pieces from becoming injured. A press, in the drawing a screw press, 13, (Figs. 1, 2, and 8) which is displaceably arranged on a traveling cross-beam 16, forces the figure-pieces 13, out of the box 2, into the mold 1. Fig. 8, illustrates this operation. The traveling cross-beam enables each point of the mold to be reached. Moreover the plate 17, of the stamp 17, is exchangeable so that it may correspond with the figure-pieces being applied at the time. When the operation of charging the mold 1, is ended the latter passes under a pressure-plate 3, provided with exchangeable stamps 18 (Figs. 1, and 3).

The pressing of the figure-pieces 13, out of the mold 1, on to a supporting fabric is effected in the following manner:—By turning the screw-spindles 20 (Figs. 1ª, and 3) which engage with their upper thread portions in the pressure-plate 3, and at the same time serve as supporting columns for this plate, the spindles 18, are first of all lowered until they touch the figure-pieces 13, situated in the mold. A cross-beam 19 (Figs. 1ª and 3) which is movable in a vertical direction and on which the mold 1 rests, and which supports at each side a roller 21, is reciprocated up and down by means of two cam-disks 22, which engage with the rollers 21, and which are fixed on the shaft 23. The screw-spindles 20, are so connected with the cross-beam 19, that they turn in the cross-beam, but cannot be shifted. The screw-spindles 20, are driven by worm-gears, the worm-wheels 24 (Figs. 1, and 2) of which are so supported that the screw-spindles 20, on the cross-beam 19, being raised and lowered can shift in the same, the rotation being transmitted by inserted keys. The worms 25, which engage in the worm-wheels 24 are rigidly connected with a hollow shaft 27 (Fig. 3). This hollow shaft is pushed loosely over the shaft 23. The shaft 28, (Fig. 2) is connected with the shaft 23, the rotation of which shaft 28, is transmitted by the toothed wheels 29, and 30, to the shaft 23. On one end of the shaft 28, a crank disk 31, (Figs. 1ª and 2ª) is arranged, which is connected by means of a rod 32, with a pawl and ratchet mechanism fixed on the hollow shaft 27. Figs. 4, and 5, show this device on an enlarged scale. 33 is a double ratchet wheel provided with teeth facing opposite directions on the nave of which wheel the levers 34, are revolubly arranged. On the free ends of these levers, the rod 32 is pivoted. Between the levers 34, is mounted a double pawl 35, the operative portions of which work in different planes, and which supports a weight 36, on its extended axle. In order to be able suitably to set the pawl and ratchet mechanism the crank disk 31, is provided with a screw-spindle 37, by the rotation of which the crank-pin 38, carrying the rod 32, can be displaced. A scale on the crank-disk shows exactly the magnitude of the stroke, and the crank-disk 31, loosely mounted on the shaft 28, can be coupled with this shaft by means of a coupling 39, which can be uncoupled. The crank-shaft 31, is provided behind with a toothed flange 40, with which a toothed wheel 42, mounted on the shaft 41, engages. The shaft 28, is driven by means of the pair of wheels 43, and 44, from the driving shaft 45. After, by the rotation of the shaft 41, the coupling 39 (Fig. 5) having been uncoupled, the stamps 18, (Figs. 1 and 3) have been lowered to such an extent by means of the above - described pawl and ratchet mechanism that they put the figure-pieces 13, in the mold 1, the coupling 39, is again coupled up and the pawl 35, is changed over by turning over the weight 36. The shafts 28, 23, (Figs. 1ª, and 2ª) which rotate at the same speed are now set in motion by the driving shaft 45, so that the cam-disk 22, on the shaft 23, first of all lowers the mold 1, until its distance from the supporting fabric 4, corresponds to the thickness of one layer of linoleum material. On further rotation occurring, during which the cam-disks hold the mold in its position, the hollow shaft 27, with the worms 25, is set in rotation by the crank-disk 31, and the pawl and ratchet-mechanism in consequence of which the screw-spindles 20, force the stamps 18, to such a distance into the mold 1, that the lowermost layer of the figure-pieces 13, is free of the mold and passes on to the supporting fabric. On the rotation continuing the cam-disks 22, engage the rollers 21 (Figs. 1ª and 3), and raise again the mold, together with the stamps which retain their position relatively to the mold. After the supporting fabric 4, has been fed forward again the mold 1, sinks again with the stamps which also still retain their position relatively to the mold. The stamps are then forced farther into the mold and the next layer of figure-pieces passes on to the fabric. This mode of operation is, however, applicable only when it is a matter of dealing with fairly small figure-pieces of ordinary size. If the figure-pieces on the contrary are of extraordinary size they can be simply pressed from above downward out of the mold on to the fabric. Such figure-pieces would sag on account of their stability being no longer sufficient and this would result in their easily falling out of the mold. In this case the figure-pieces instead of being pressed from above downward on to a fabric, must be pressed from below upward out of the mold, so that the layer passing out of the mold can be removed by suitable devices and be brought on to a fabric. In this case consequently the stamps 18, would not be lowered from above downward into the mold 1, but they would penetrate from below into the mold 1, and they would push a layer of figure-pieces upward out of the mold. The removal of this layer can be effected, either by spikes or the like, or by means of suction. When the removal is effected by means of spikes or the like, a plate 65 (Fig. 14) is situated over the mold 1, which plate throughout its entire length and breadth is fitted on the surface turned toward the mold 1, with needles 66, which pass through a second plate 67, having corresponding holes 68. These two plates are arranged both vertically and horizontally rotatable. After the uppermost layer of figure-pieces 69 has been pressed by the stamps 18, out of the mold, the two plates, 65 and 67, sink simultaneously on to the figure-pieces (Fig. 14) so that the needles 66, penetrate into said pieces. When the plates are subsequently raised, the figure-pieces remain suspended on the needles (Fig. 15) and are pushed together with the plates in a horizontal direction over the fabric 4 (Fig. 16) and then deposited. During this operation the two plates first sink until the figure-pieces 69, adhering to the needles touch the fabric (Fig. 17), the lower plate 67, provided with an elastic layer 70 (cork, rubber or the like) resting on the figure-pieces. The elastic layer prevents on the one hand the superimposed figure-pieces from being too severely pressed while being removed, and on the other hand the elastic layer cleans the needles from any particles of material possibly adhering to them, which is a matter of great importance. The upper plate 65, is now raised until the needles are out of the figure-pieces, while the lower plate 67, remains resting on the figure-pieces. Then the two plates are raised together, the figure-pieces remain lying on the fabric, and are brought back in a horizontal direction over the mold 1, and are lowered on to the second layer of figure-pieces, which has been meanwhile forced out of the mold and so on.

The removal of the figure-pieces by means of suction is effected in the following manner:—Above the perforated plate 67, an air-tight space 71, (Fig. 12) is so arranged that it incloses the plate 67, throughout its entire length and breadth. Into this space open branch pipes 73, connected with a main 72, which are so arranged that they are uniformly distributed over the plate 67 (Fig. 3). With a union 74, on the main 72, a flexible metallic hose 75, is connected which is connected with a suction apparatus. The flexible metallic hose permits the plate 67, with the suction pipes to move upward and downward, and also a movement in a horizontal direction. Before the plate 67, is set down on the figure-pieces the suction action at this plate is done away with by opening the main 72, or in any suitable manner. The plate 67, now descends on to the figure-pieces, and the suction action is produced, whereupon the plate rises with the upper layer of figure-pieces. The suction-holes 68, are uniformly distributed close together over the whole plate 67, as shown in Fig. 13. This arrangement makes it possible to raise by means of one and the same plate, each layer of figures without regard to composition and design. After raising the plate 67, the further operation is the same as that represented in Figs. 15, 16, and 17. Whether the figure-pieces are removed from the compartments of the mold 1, by the plungers, or by suction, or by the spikes or pins, the expansive action of the previously compressed linoleum is the same, and this expansion prevents any spaces or openings at the edges of the figure-pieces, which expand and contract with one another as soon as they leave the compartments of the mold 1. The figure-pieces lie close together on the surface of the supporting or following layer, and after they have been conveyed to and placed on the fabric by either the spikes or pins, they will remain in their relative positions owing to the rough surface of the fabric, which consists of jute or other suitable material. If the pieces are placed on the fabric by suction, the process is the same as with the needles, the suction being interrupted after the figure-pieces have been deposited on the fabric.

When the process is applied in the manner indicated in Figs. 12, to 17, the mold 1, can be so supported that the thin intermediate walls can be dispensed with. In that case the figure-pieces do not require to be first pressed into the boxes 2, but they may be placed in layers in the stamp-plates and be immediately pushed from below into the mold situated above, or the mold be pressed over the same. The mold may also be opened by removing one or several walls, and the figure-pieces piled on one another be inserted, the stamp-plates forming the bottom of the mold and the figure-pieces being readily compressed by drawing together the walls by means of screws or the like, whereupon the stamps press the figure-pieces in layers from below upward out of the mold.

The forward motion of the supporting fabric is effected by a second crank-disk 46, which in construction corresponds with the crank-disk 31, and is mounted firmly on the same shaft 28. The rod 47, (Figs. 1, and 1ª, and Figs. 2 and 2ª), which on the one hand engages with the crank-pin 48, and on the other hand is revolubly fastened to a slide-shoe 49, gives to the latter the reciprocating movements. A steel band 50, likewise engaging with the slide-shoe 49, transmits this motion to the casing 51, of a friction coupling which is arranged on the axle of a needle roller 52, serving to draw forward the supporting fabric 4. A second steel band 53, carries at its free end a plate 54, which serves on the one hand to move back the casing 51, and on the other hand to render non-injurious the slight shocks which occur. In Figs. 6, and 7, the friction coupling is represented to an enlarged scale. The casing 51, loosely mounted on the axle carries on its nave two flanges 57, provided with slots 56, (Fig. 6). The rim of this case is adapted to receive on its outer surface the steel bands 50, 53. On each side of the case 51, a driving disk 58, is firmly connected with the axle and projects at its circumference into the case. The cheeks 59, fit the circumference of the driving disks 58, and are provided on their friction surface with a leather facing 60. At their ends facing the axle the cheeks are provided with rollers 61, which engage in the slots 56, of the flanges 57. The cheeks 59, are guided by means of case projections 62, which engage in slots 63, in the disk 64. These disks are loose on the nave of the case. When the case 51, rotates in the direction of the arrow (Fig. 6), the cheeks 59, are drawn together by means of the slots 56, and are applied firmly against the driving disk 58. When rotating in the opposite direction the cheeks move apart, their movements being limited by the internal surface of the rim of the casing. This arrangement enables any desired magnitude of feed movement to be obtained, so that designs can be carried out with repetition at any desired intervals.

The supporting fabric is guided and stretched by means of a weighted roller 65 (Figs. 1, and 2), and a needle roller 66, which is provided with a brake 67. The supporting fabric 4, is guided from the roll 68, over the guide rollers 69, 70, and the needle roller 66, under the mold 1, and a flat hydraulic press 71, and over the needle roller 52, after which it loops around the weight-roller 65, and passes over the guide roller 72, to a winding-up device which, however, is not intended to be the subject matter of the present invention. The thorough union of the figure-pieces with each other and with the fabric takes place under the heated presses in the well known manner. The weight-roller 65, the weight of which is equal to double the tension of the supporting fabric 4, is suspended freely in this fabric and is guided in slots 73, at its two ends in order that it may not oscillate. This arrangement insures the supporting fabric having always a constant tension as the needles of the feed-roller 52 (Fig. 11), are so set, that they cannot take up the pull exerted by the weight-roller 65, on the fabric, whereas the needles of the roller 66, grasp the fabric. The brake 67, (Figs. 1ª, 2ª, and 11) however, prevents the needle-roller 66, from rotating merely under the tension due to the weight-roller 65, because said brake balances the tension due to the weight of the roller 65. The forward motion of the supporting fabric 4, in the direction of the arrow (Figs. 1 and 11) is consequently possible only by turning the feeding needle-roller 52 (Figs. 2, and 11).

In practice it is recommended to use two molds 1, instead of one, so that the second mold can be charged by the workmen while the machine is emptying the first mold.

What I claim as new, and desire to secure by Letters Patent is:—

1. A machine for making linoleum mosaic, including a mold or receptacle provided with figure-piece-receiving compartments of the design to be produced, means for supporting a fabric in position for receiving the figure-pieces, and mechanism for removing the figure-pieces from the mold or receptacle in layers and for depositing the layers successively upon the said fabric.

2. A machine for making linoleum mosaic, including a mold or receptacle having thin walls forming figure-piece-receiving compartments of the design to be produced, means for supporting a fabric in position to receive the figure-pieces, mechanism for simultaneously removing the figure-pieces in layers from the compartments of the mold or receptacle, and for depositing the layers successively upon the supporting fabric, said mold or receptacle and supporting fabric having relative movement.

3. A machine for making linoleum mosaic, including a mold or receptacle provided with separate figure-piece-receiving compartments arranged in the form of the design to be produced, means for supporting the fabric in position to receive the figure-pieces, and plungers arranged to operate in the compartments of the mold or receptacle for expelling the figure-pieces simultaneously in layers.

4. A machine for making linoleum mosaic, including a mold or receptacle having separate figure-piece-receiving compartments arranged in the form of the design to be produced, means for supporting a fabric in position to receive the figure-pieces, mechanism for moving the mold or receptacle to and from the fabric, plungers for expelling the figure-pieces simultaneously from the compartments to form layers, and means for advancing the supporting fabric.

5. A machine for making linoleum mosaic, including a mold or receptacle having separate figure-piece-receiving compartments, means for supporting a fabric in position to receive the figure-pieces, plungers for expelling the figure-pieces from the said compartments, means for moving the mold toward and from the fabric, means for actuating the plungers when the mold is in position for depositing the figure-pieces on the supporting fabric, and means for advancing the supporting fabric.

6. A machine for making linoleum mosaic, including a mold, a plate provided with stamps or plungers, a support, mechanism comprising spaced cams for raising and lowering the support, rotary screw-spindles mounted on the support and connected with the plate for sinking the stamps or plungers into the mold, and gearing for rotating the screw-spindles.

7. A machine for making linoleum mosaic, including a mold, a plate provided with stamps or plungers, a support, mechanism for raising and lowering the support, a shaft, cams mounted on the shaft for raising and lowering the support, screw-spindles mounted on the support and connected with the plate and forming supporting columns for the latter, a hollow shaft mounted on the said shaft, and worm gearing connecting the hollow shaft with the screw-spindles.

8. A machine for making linoleum mosaic, including means for supporting a fabric, ratchet mechanism for feeding the fabric forward, a weighted tension roller carried by the fabric, and a weighted friction device for controlling the feed of the fabric.

9. A machine for making linoleum mosaic, including a needle roller for actuating a supporting fabric, a weighted tension roller suspended in the fabric, guiding means for the tension roller, and a brake connected with the needle roller and provided with a weight.

10. In an apparatus for making inlaid linoleum, a vertically movable assembling platen, a pressing platen arranged laterally thereto, and over which the backing fabric is fed, and a lifting member capable of vertical and horizontal displacement relative to said assembling platen and said pressing platen, and adapted to lift the assembled layers or sections and transport the same onto the backing fabric over the pressing platen.

11. In an apparatus for making inlaid linoleum, a vertically movable assembling platen, a pressing platen over which the backing fabric is fed, and a lifting member comprising a studded plate and a perforated plate, both said plates being capable of moving together vertically and horizontally relative to the assembling platen and said pressing platen and vertically relative to one another.

12. In an apparatus for making inlaid linoleum, a vertically movable assembling platen, a pressing platen, over which the backing fabric is fed, and a lifting member comprising a studded plate and a perforated plate through which the studs project and which is formed with an elastic layer, said two plates being capable of moving vertically and horizontally relative to said assembling platen and said pressing platen and independently in vertical direction relative to one another.

In testimony whereof, I affix my signature in presence of two witnesses.

GUSTAV FRENKEL.

Witnesses:
 L. H. ANDERSON,
 WILLIAM KLEIN.

Copies of this patent may be obtained for five cents each, by addressing the "Commissioner of Patents, Washington, D. C."